(12) United States Patent
Bissell et al.

(10) Patent No.: US 9,542,501 B2
(45) Date of Patent: Jan. 10, 2017

(54) SYSTEM AND METHOD FOR PRESENTING CONTENT IN A CLIENT/SERVER ENVIRONMENT

(75) Inventors: Shawn Bissell, North Vancouver (CA); Kent Alstad, Sechelt (CA); Michael R. Benna, Vancouver (CA)

(73) Assignee: Radware Ltd., Tel Aviv (IL)

( * ) Notice: Subject to any disclaimer, the term of this patent is extended or adjusted under 35 U.S.C. 154(b) by 540 days.

(21) Appl. No.: 13/357,624

(22) Filed: Jan. 25, 2012

(65) Prior Publication Data

US 2012/0194519 A1    Aug. 2, 2012

Related U.S. Application Data

(60) Provisional application No. 61/437,530, filed on Jan. 28, 2011.

(51) Int. Cl.
*G06T 17/00* (2006.01)
*G06F 17/30* (2006.01)

(52) U.S. Cl.
CPC ............... *G06F 17/30905* (2013.01)

(58) Field of Classification Search
CPC ................................. G06F 17/30905
See application file for complete search history.

(56) References Cited

U.S. PATENT DOCUMENTS

| | | |
|---|---|---|
| 5,564,070 A | 10/1996 | Want |
| 5,784,562 A | 7/1998 | Diener |
| 6,038,601 A | 3/2000 | Lambert |
| 6,370,687 B1 | 4/2002 | Shimura |
| 6,385,641 B1 | 5/2002 | Jiang et al. |
| 6,457,103 B1 | 9/2002 | Challenger et al. |
| 6,604,143 B1 | 8/2003 | Nagar |
| 6,618,751 B1 | 9/2003 | Challenger |
| 6,742,043 B1 * | 5/2004 | Moussa et al. ............... 709/232 |

(Continued)

FOREIGN PATENT DOCUMENTS

| | | |
|---|---|---|
| NZ | 566291 | 2/2008 |
| WO | 0178334 | 10/2001 |
| WO | 0186494 | 11/2001 |

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

(Continued)

*Primary Examiner* — William Beutel
(74) *Attorney, Agent, or Firm* — M&B IP Analysts, LLC (57) ABSTRACT

Viewing of web pages is improved by prioritizing image rendering based on positioning of images within a web page. For example, for images that are likely to be initially viewable upon presentation of the web page (i.e., prior to scrolling), compressed proxy versions are made available so that the images can be transferred and rendered more quickly. These compressed proxy images are later replaced with better quality renderings of the same images. Fetching of images that are not initially visible can be deferred until after other, more important page resources are loaded. Prioritization of page loading in this manner helps to ensure that the page becomes operational earlier, resulting in improved perceived speed and responsiveness, and greater ease of navigation.

41 Claims, 7 Drawing Sheets

(56) References Cited

U.S. PATENT DOCUMENTS

| | | | |
|---|---|---|---|
| 6,839,741 B1 | 1/2005 | Tsai | |
| 7,043,460 B2 | 5/2006 | Deboer et al. | |
| 7,096,418 B1 | 8/2006 | Singhal et al. | |
| 7,119,760 B2* | 10/2006 | Edge et al. | 345/2.1 |
| 7,139,780 B2 | 11/2006 | Lee et al. | |
| 7,194,522 B1 | 3/2007 | Swildens et al. | |
| 7,266,595 B1 | 9/2007 | Black et al. | |
| 7,295,953 B2 | 11/2007 | Cox et al. | |
| 7,392,294 B2 | 6/2008 | Hellstrom | |
| 7,398,304 B2 | 7/2008 | Smith et al. | |
| 7,469,280 B2 | 12/2008 | Simpson | |
| 7,711,854 B2 | 5/2010 | Ecklund et al. | |
| 7,865,585 B2 | 1/2011 | Samuels et al. | |
| 7,886,218 B2 | 2/2011 | Watson | |
| 7,895,256 B2 | 2/2011 | Zombek et al. | |
| 8,001,175 B2 | 8/2011 | Betancourt et al. | |
| 2002/0051223 A1* | 5/2002 | Izumi et al. | 358/402 |
| 2002/0065899 A1 | 5/2002 | Smith et al. | |
| 2002/0120753 A1* | 8/2002 | Levanon et al. | 709/228 |
| 2002/0156881 A1 | 10/2002 | Klopp Lemon et al. | |
| 2003/0004937 A1 | 1/2003 | Salmenkaita et al. | |
| 2003/0004998 A1 | 1/2003 | Datta | |
| 2003/0040995 A1 | 2/2003 | Daddario et al. | |
| 2003/0065810 A1 | 4/2003 | Ims et al. | |
| 2003/0078964 A1 | 4/2003 | Parrella, Sr. et al. | |
| 2003/0093520 A1* | 5/2003 | Beesley | 709/224 |
| 2003/0191812 A1 | 10/2003 | Agarwalla et al. | |
| 2003/0204769 A1 | 10/2003 | Coughlin | |
| 2003/0225897 A1 | 12/2003 | Krawetz | |
| 2004/0043758 A1 | 3/2004 | Sorvari et al. | |
| 2004/0117438 A1 | 6/2004 | Considine | |
| 2004/0205165 A1 | 10/2004 | Melamed et al. | |
| 2004/0236824 A1 | 11/2004 | Millington et al. | |
| 2004/0268357 A1 | 12/2004 | Joy | |
| 2005/0033855 A1 | 2/2005 | Moradi et al. | |
| 2005/0108335 A1 | 5/2005 | Naick et al. | |
| 2005/0138033 A1 | 6/2005 | Katta | |
| 2005/0188048 A1 | 8/2005 | Yuan et al. | |
| 2005/0210243 A1 | 9/2005 | Archard | |
| 2005/0261985 A1 | 11/2005 | Miller et al. | |
| 2005/0262220 A1* | 11/2005 | Ecklund et al. | 709/219 |
| 2006/0015512 A1 | 1/2006 | Alon et al. | |
| 2006/0095527 A1 | 5/2006 | Malik | |
| 2006/0143290 A1 | 6/2006 | Dostert et al. | |
| 2006/0212149 A1 | 9/2006 | Hicken et al. | |
| 2006/0212601 A1 | 9/2006 | Hampton | |
| 2006/0224723 A1 | 10/2006 | Chen | |
| 2006/0225065 A1 | 10/2006 | Chandhok et al. | |
| 2006/0235941 A1* | 10/2006 | Arcas et al. | 709/217 |
| 2007/0005603 A1 | 1/2007 | Jain et al. | |
| 2007/0174644 A1 | 7/2007 | Willig | |
| 2007/0180035 A1 | 8/2007 | Liu et al. | |
| 2007/0260748 A1 | 11/2007 | Talkington | |
| 2007/0268865 A1 | 11/2007 | Garcia et al. | |
| 2007/0291741 A1 | 12/2007 | Hwang | |
| 2008/0008109 A1 | 1/2008 | Ollis | |
| 2008/0016240 A1 | 1/2008 | Balandin | |
| 2008/0208789 A1 | 8/2008 | Almog | |
| 2008/0208961 A1 | 8/2008 | Kim | |
| 2009/0132658 A1 | 5/2009 | Glickstein | |
| 2009/0254707 A1 | 10/2009 | Alstad | |
| 2009/0270076 A1 | 10/2009 | Zhou et al. | |
| 2009/0276488 A1 | 11/2009 | Alstad | |
| 2010/0017464 A1* | 1/2010 | Cheng et al. | 709/203 |
| 2011/0202966 A1* | 8/2011 | Gupta et al. | 725/114 |
| 2011/0295979 A1 | 12/2011 | Alstad et al. | |
| 2011/0304625 A1* | 12/2011 | Gerhard | G06T 11/00 345/428 |

OTHER PUBLICATIONS

"Optimize caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

International Searching Authority, "International Preliminary Report on Patentability (Chapter 1 of the Patent Cooperation Treaty) including Written Opinion of the International Searching Authority (PCT Rule 43bis.1)" for the corresponding International Patent Application No. PCT/IB2012/050342; date of issuance Jul. 30, 2013.

* cited by examiner

SYSTEM AND METHOD FOR PRESENTING CONTENT IN A CLIENT/SERVER ENVIRONMENT

CROSS-REFERENCE TO RELATED APPLICATION

The present application claims priority from U.S. Provisional Application Ser. No. 61/437,530 for "Image Optimization," filed Jan. 28, 2011, the disclosure of which is incorporated herein by reference.

The present application is related to U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference.

The present application is related to U.S. Utility application Ser. No. 13/110,524 for "Accelerating HTTP Responses in a Client/Server Environment," filed May 18, 2011, the disclosure of which is incorporated herein by reference.

FIELD OF THE INVENTION

The present invention relates to optimizing performance and response time when presenting images in a client/server environment.

BACKGROUND

Conventionally, in client-server network systems, such as the Internet, HTTP clients such as web browsers render HTTP responses including HTML content, such as web pages received from web servers. Typically, the client requests the HTML content from the web server, and then renders and displays the content for the user. Such content can include, for example, text, images, interactive content, and the like, and/or any combination thereof.

Because of transfer speed, bandwidth restrictions, latency, and/or rendering speed, it can take some time for content to appear on the user's screen. Images often take longer than other forms of content, because they involve relatively large amounts of data that must be transferred to the client, and because there may be limitations on the rendering speed because of the available processing power of the client machine. Accordingly, users of browser software often experience a lag time between the moment when a web page is requested (for example by clicking on a link or entering a URL) and the time when the complete web page, including its images, is presented on the screen for the user to see.

It is known to store images according to a progressive compression mechanism. For example, the progressive JPEG format compresses the image data in multiple passes of successively higher levels of detail. When an image in progressive JPEG format is rendered at a browser, a lower level of detail can be initially displayed. As more data is received at the client, the lower-resolution version of the image can be replaced by successively higher resolution versions. In this manner, the user can see an initial version of the image more quickly than if the browser waited until the full-resolution image were received and rendered.

Web pages often extend beyond the area that is initially viewable on a window of the user's display screen. Typically, an initial portion of the web page is shown (occupying either the full display screen or a window on the display screen; this display area is referred to herein as a "viewport"), and the user can scroll down to see the remainder of the web page. Web page authors often take into account which areas of the web page are likely to be initially viewable upon presentation of the web page. However, such areas differ from client to client, depending on various factors such as screen size, screen resolution, browser settings, user-specified preferences, and the like. Tools such as Google Browser Size, available from Google Inc. of Mountain View, Calif., provide web page authors with guidance as to which areas of the web page are likely to be initially viewable by what percentage of users.

Existing image optimization methods do not adequately take into account which areas of a web page are likely to be initially viewable upon presentation of the web page. Rather, such existing techniques generally make no distinction between those images that are likely to be initially viewable and those that are not.

SUMMARY

According to various embodiments of the present invention, viewing of web pages is improved by prioritizing image rendering based on positioning of images within the web page. For example, for images that are likely to be initially viewable upon presentation of the web page (i.e., prior to scrolling), compressed proxy versions are made available so that the images can be transferred and rendered more quickly. These compressed proxy images are later replaced with better quality versions of the same images.

In various embodiments, fetching of images that are not initially visible is deferred until after other, more important page resources (such as scripts and/or interactive elements) are loaded. Prioritization of page loading in this manner helps to ensure that the page becomes operational earlier. The techniques of the present invention thus result in improved perceived speed and responsiveness, and allow the user to navigate within and between pages more quickly.

In one embodiment, the initially displayed proxy images are compressed versions of the original images. If necessary, these proxy images can be distorted, stretched, and/or otherwise fitted to the proper positions and sizes on the web page.

In one embodiment, a script is inserted in the HTML response, for example in JavaScript format, to cause the original, full-resolution images to be loaded asynchronously. These original images are presumably higher quality than the compressed proxy images, and may take longer to be loaded and rendered.

The result is an effect in which the images on the page look blurry at first and then become clear once their full-resolution versions finish downloading and are rendered within the page.

Insertion of the proxy images in the HTML response, as well as the script to load the original images, can take place at the server or at a network appliance or other device that intercepts the HTML response on its way to the client. In one embodiment, the compressed versions of the images may be embedded in the original HTML document, and the scripts to load and display the images may be added at the server.

In various embodiments, any number of intermediate-resolution images can be provided. Thus, the present invention can operate with a two-step process of obtaining and displaying images (one lower resolution and one full resolution), or it can include any number of steps.

Whichever version of the images are being displayed at any given time, the overall structure, color, content, and interactivity of the page need not change. The operation of the invention can thus be relatively unobtrusive, so that the user can continue to interact with the web page in a normal manner even as lower-resolution versions of images are being replaced with higher-resolution ones. In one embodiment, a transition effect can be presented when an image is being replaced; without limitation, examples of such transitions include a dissolve effect, fade in/out effect, and/or the like.

The techniques of the present invention thus provide a mechanism for accelerating rendering and reducing the time to interactivity of the portion of a web page that is visible before any scrolling is done, which often contains the most important part of the page being rendered.

In one embodiment, the present invention can be combined with other optimization techniques, such as those described in related U.S. Utility application Ser. No. 12/426,909 for "Extensible, Asynchronous, Centralized Analysis and Optimization of Server Responses to Client Requests," filed Apr. 20, 2009, and/or those described in related U.S. Utility application Ser. No. 13/110,524 for "Accelerating HTTP Responses in a Client/Server Environment," filed May 18, 2011. The disclosures of these related applications are incorporated herein by reference.

One skilled in the art will recognize that the image optimization techniques described herein can be applied to other scenarios and conditions, and are not limited to the specific examples discussed herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention. In particular, the sequence diagrams provided herein are intended to show an example of a particular sequence of events that can be used to implement the invention. One skilled in the art will recognize, however, that the events can take place in a different sequence, and/or that some events can be omitted and/or others added, without departing from the essential characteristics of the invention as set forth in the claims.

DETAILED DESCRIPTION OF THE EMBODIMENTS

In one embodiment, the method of the present invention is implemented in a system for presenting web-based content, such as web pages, to a user. One example of such a system is a client/server architecture in which software, such as a browser running on a client machine, requests content from a server, including HTML pages and/or other resources such as images. The content is delivered over a communications network such as the Internet, using known communications protocols such as HTTP and TCP/IP.

In the examples and drawings presented herein, the present invention is described in connection with mechanisms for optimizing the display of images in web pages, as they may be presented on a browser running on a client. However, one skilled in the art will recognize that the methods of the present invention can also be applied to other forms of optimization, including optimization of resources other than images. In addition, one skilled in the art will recognize that the methods of the present invention can also be applied to systems using protocols other than HTTP, resource requests other than HTML web pages and images, and files of any format. In short, the techniques described herein can be applied to any suitable type of data or content delivered across any electronic network and presented using any suitable output mechanism(s).

The system of the present invention can be implemented using a network appliance (also referred to as an accelerator) that intercepts the requested content before it reaches the client, and makes appropriate modifications to the HTML code before relaying it to the client. Such an appliance can be located, for example, in a data path between the server and the client. Such an appliance can be incorporated in a hardware device such as a router, or it can be a standalone device. Alternatively, the system of the present invention can be implemented by software running at the client and/or server. For example, compressed versions of images may be embedded in the original HTML documents, and the scripts to load and display the images may be added at the server.

System Architecture

Figure 1A:
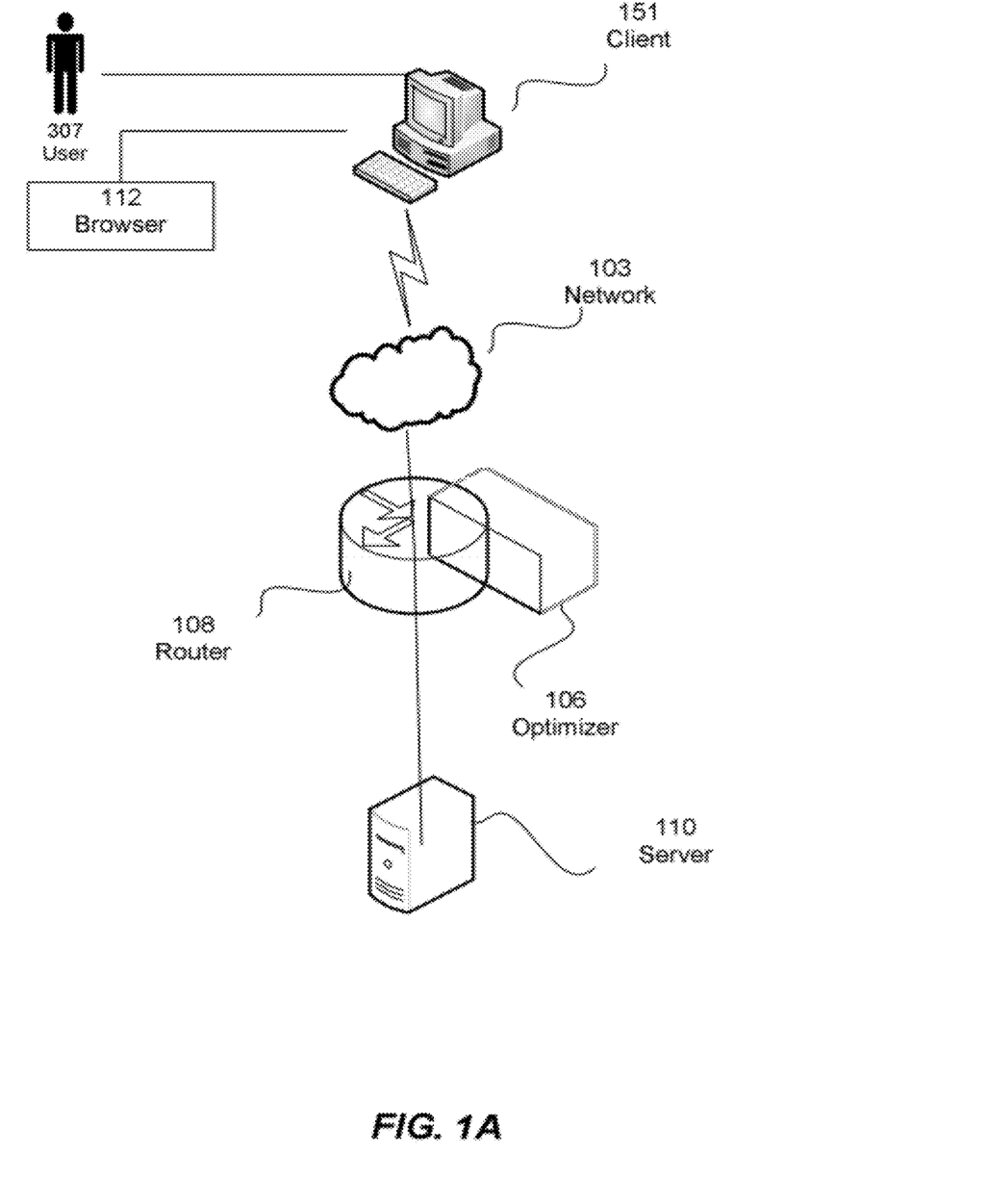
FIG. 1A depicts an architecture for practicing the present invention according to one embodiment, wherein an optimizer for performing image optimization resides in a network device such as a router.

Referring now to FIG. 1A, there is shown an architecture for practicing the present invention according to one embodiment, wherein an optimizer 106 for performing the techniques of the present invention resides in a network device such as router 108. As depicted in FIG. 1A, in such a configuration, optimizer 106 is positioned between server 110 and client machine 151. Server 110 may be an HTTP server, web server, or other server; client machine 151 may be an HTTP client or any other electronic device capable of sending and receiving messages on network 103. Network 103 may be the Internet or any other network that enables communication among two or more electronic devices. Network 103 may be implemented using well-known network protocols such as Hypertext Transfer Protocol (HTTP), Secure Hypertext Transfer Protocol (SHTTP), Transmission Control Protocol/Internet Protocol (TCP/IP), and/or the like. In some embodiments, secure access to network 103 may be facilitated via well known techniques such as a Virtual Private Network (VPN), although such secure access is not required.

Client 151 and/or server 110 may be computers or any other electronic devices. Examples include, without limitation, a desktop computer, laptop computer, personal digital assistant (PDA), cellular telephone, smartphone, music player, handheld computer, tablet computer, kiosk, game system, enterprise computing system, server computer, or the like. In one embodiment, client 151 and/or server 110 are desktop computers running an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on such devices.

In one embodiment, client 151 and/or server 110 each include a number of hardware components as are well known to those skilled in the art, including for example one or more input devices (such as a keyboard, mouse, touchscreen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 1A for clarity.

One skilled in the art will recognize that the particular arrangement of hardware elements shown in FIG. 1A is merely exemplary, and that the invention can be implemented using different hardware elements configured in any of a number of different ways. Thus, the particular architecture shown in FIG. 1A is merely illustrative and is not intended to limit the scope of the invention in any way.

One skilled in the art will recognize that any number of devices, singly or in any combination, may be configured to fulfill the roles of client 151 and/or server 110 described herein without departing from the scope of the present invention.

In one embodiment, client 151 operates under the direction and control of user 307, who interacts with client 151 via a user interface according to well-known techniques.

Client 151 may run web browser 112 and/or another software application for enabling network communications and for presenting content, such as web pages including images, to user 307. For illustrative purposes, the invention is described herein in terms of requesting, receiving, and rendering a web page including images at browser 112 running on client 151.

In one embodiment, router 108 is implemented as a computing device configured to route network traffic between client 151 and server 110 according to well known mechanisms. Router 108 may include optimization and acceleration components as described in related U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference. Such components may include, for example, optimizer 106 as described in the related application.

In one embodiment, optimizer 106 can be implemented as a software-based component of router 108. Accordingly, router 108 may include a processor (not shown) for performing the techniques of the present invention in accordance with software and/or firmware instructions.

Figure 1B:
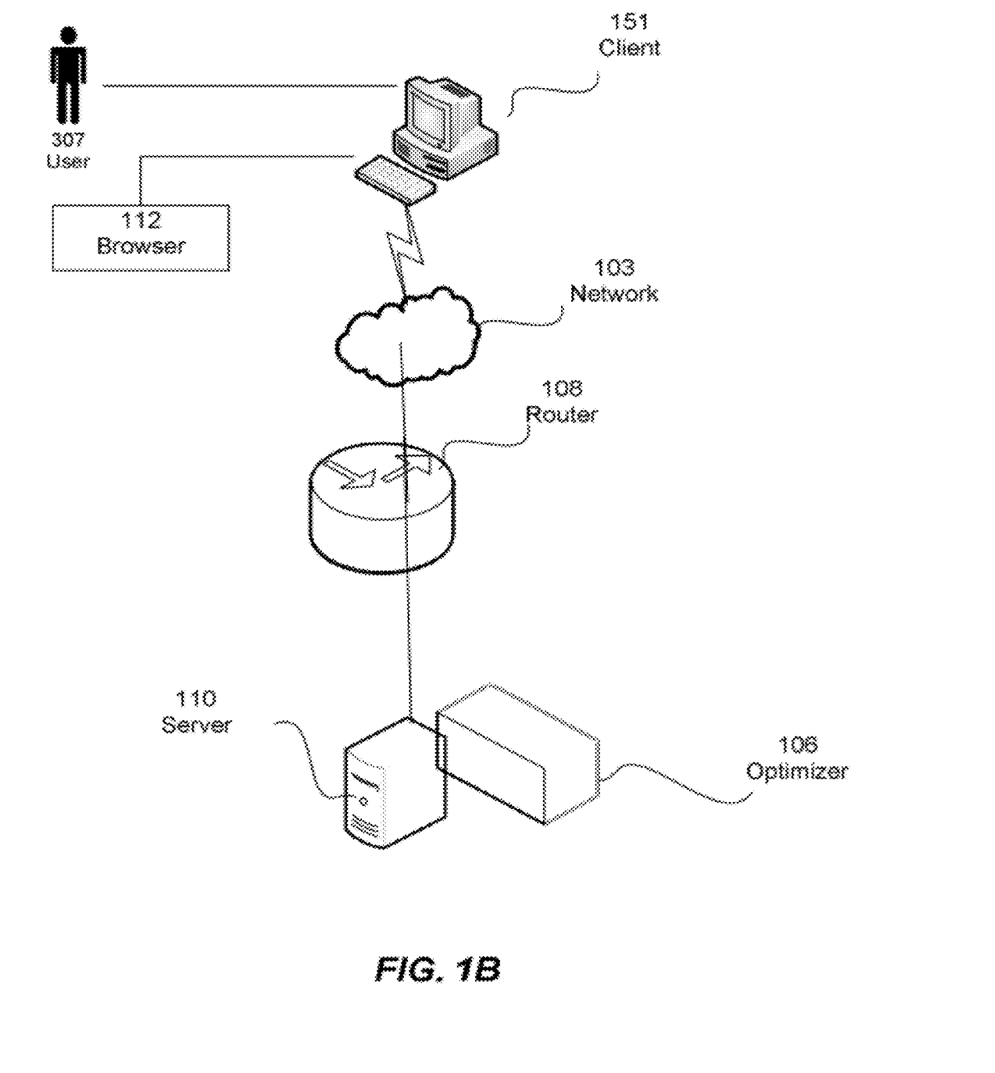
FIG. 1B depicts an architecture for practicing the present invention according to one embodiment, wherein an optimizer for performing image optimization resides in a server.

Referring now to FIG. 1B, there is shown an architecture for practicing the present invention according to another embodiment, wherein optimizer 106 resides in server 110. One skilled in the art will recognize that the techniques of the present invention can be implemented in an optimizer 106 or other component having any suitable location within the overall network architecture, and that the particular arrangements shown in FIGS. 1A and 1B are merely exemplary. For example, optimizer 106 can be implemented as part of a stand-alone network appliance located in the communication path between client 151 and server 110. Optimizer 106 can also be implemented using any number of network appliances and/or other components in any suitable combination.

Figure 2:
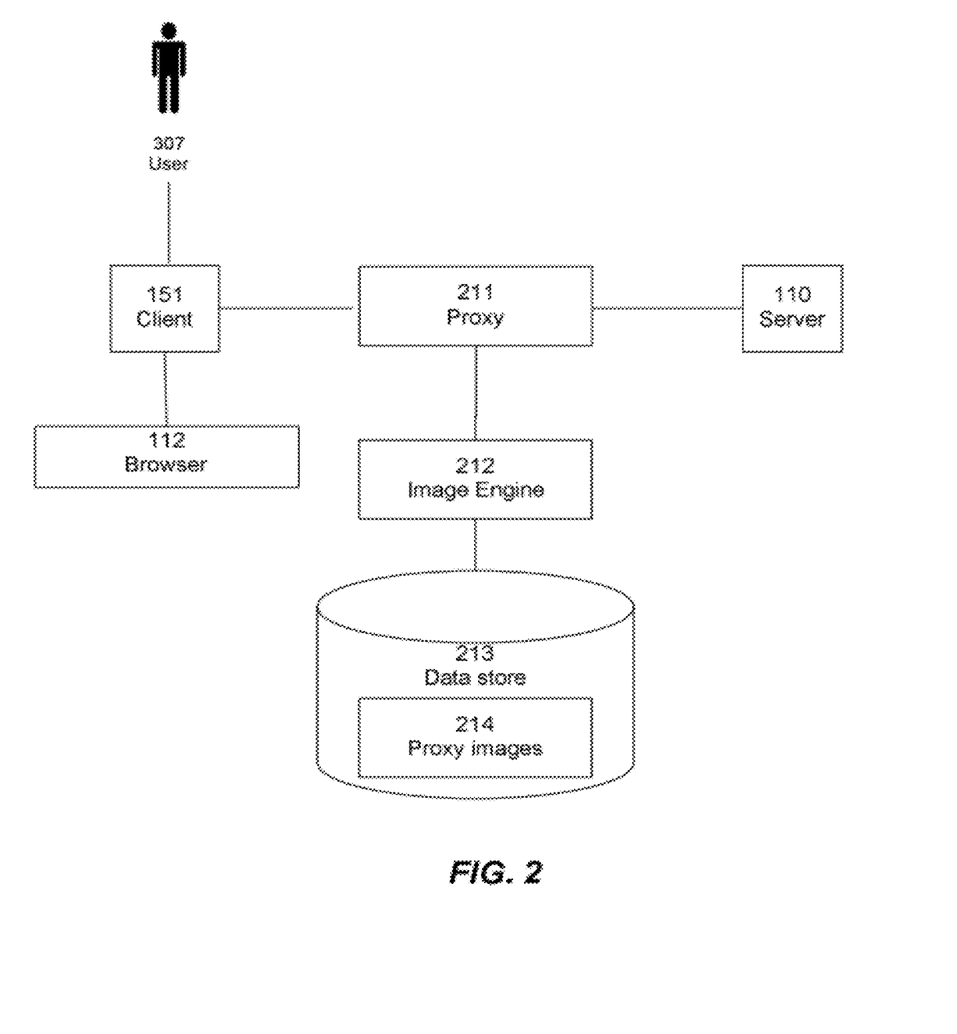
FIG. 2 is a block diagram depicting a conceptual architecture for implementing the present invention according to one embodiment.

Referring now to FIG. 2, there is shown a block diagram depicting a conceptual architecture for implementing the present invention according to one embodiment. The depicted architecture is merely exemplary; the system of the present invention can be implemented using any number of software and/or hardware components in any suitable configuration.

Client 151 can be any conventional computing system or machine, or any other electronic device capable of displaying content on an output device such as a display screen. Client 151 can run browser software 112 for presenting such content, such as web pages including images and other resources received from server 110 in response to requests. Browser 112 can be any conventional browser with JavaScript functionality, such as for example Microsoft Internet Explorer, available from Microsoft Corporation of Redmond, Wash. One skilled in the art will recognize that other scripting languages besides JavaScript can be used.

Server 110 may be a web server or any other type of server, such as an HTTP server capable of receiving requests via HTTP and returning content in response to such requests.

User 307 interacts with client 151, for example by typing URLs and clicking on links within browser software 112. In response to such actions, client 151 makes requests of web pages, images, and other resources from server 110. Such requests can be transmitted via an electronic network such as the Internet, although any suitable wired and/or wireless network can be used.

Proxy 211 acts as an intermediary which performs operations such as modifying content (such as images and HTML code) obtained from server 110, before such content reaches client 151. Proxy 211 can be an accelerator proxy 211 or any other suitable device, such as an HTTP proxy capable of parsing and rewriting HTML responses. Such a proxy can be implemented, for example in a network appliance capable of intercepting and/or relaying requests, responses, and/or other messages traveling between server 110 and client 151. In one embodiment, client 151, server 110, and proxy 211 communicate with one another via an electronic network such as the Internet, although any suitable wired and/or wireless network can be used.

In one embodiment, proxy 211 intercepts and forwards client 151 requests that are addressed to server 110, intercepts HTML responses received from server 110, and modifies such HTML responses before forwarding them to client 151. Such modifications may include, for example, revising image references to point to lower-resolution images, and inserting deferred image loader scripts. Proxy 211 can be implemented as part of optimizer 106 (either at router 108, server 110, or at any other suitable location), or it can be a separate component. In one embodiment, proxy 211 is implemented as an accelerator or similar in-line network device that acts as an HTTP proxy capable of parsing and rewriting HTML responses. As mentioned above, the functions performed by proxy 211 can be performed by software running at server 110.

Proxy 211 may also request proxy images from image engine 212, which generates or retrieves lower-resolution versions of images received from server 110. Image engine 212 can be implemented, for example, using any available device or system, or using a transformation service capable of compressing images using standard image compression libraries.

The lower-resolution versions, referred to as proxy images 214, can be pre-rendered (and retrieved from data store 213 as needed) or rendered on the fly. Data store 213 is an optional component for storing proxy images 214. Data store 213 can be at any location; in one embodiment, data store 213 represents a remote server where proxy images 214 are stored.

Each of these components can be implemented using any combination of hardware, firmware, and software. For example, the components may be implemented as software modules for controlling the operation of a processor in optimizer 106. Any number of these components can be implemented in a network appliance, accelerator, optimizer 106, server 110, router 108, client 151, or any combination thereof. In one embodiment, for example, proxy 211 is an accelerator proxy implemented as part of a network appliance.

Example of Web Page

Figure 3A:
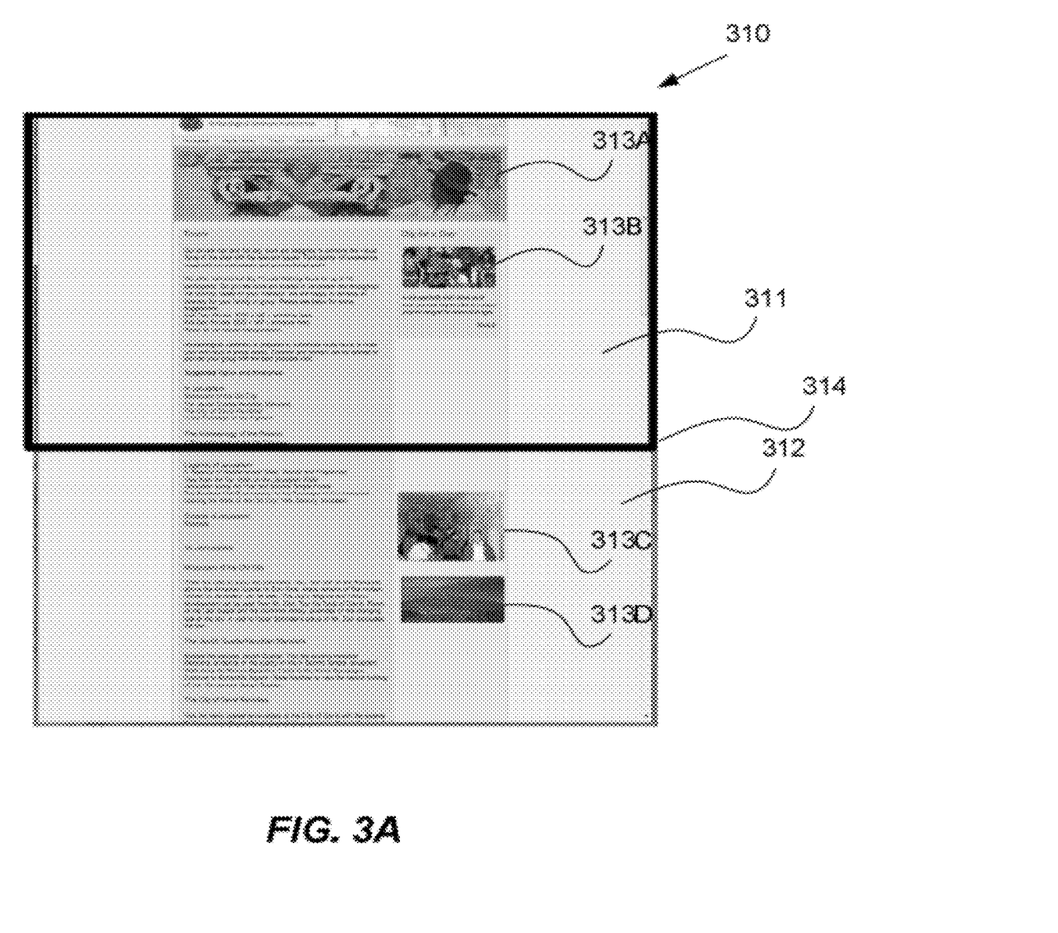
FIGS. 3A and 3B depict an example of the display of a web page including above-the-fold and below-the-fold images.
Figure 3B:
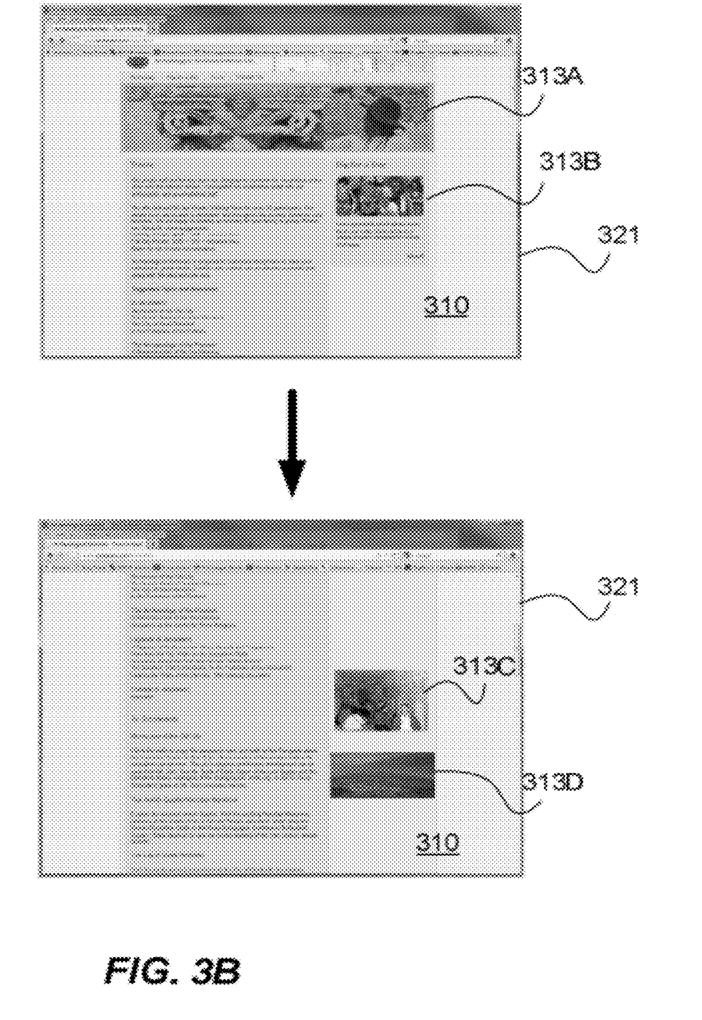

Referring now to FIGS. 3A and 3B, there is shown an example of the display of a web page 310 including above-the-fold and below-the-fold images as it might appear in a browser window 321, or viewport. Web page 310 is an HTML page that might be returned by server 110 in response to a request from client 151. For example, user 307 may enter a URL or click on a link, causing browser 112 to request web page 310, which is then provided by server 110. Since viewport 321 may be limited in size, only a portion 311 of web page 310 may initially be presented for viewing by user 307, as shown in the upper portion of FIG. 3B. Remaining portion 312 is not initially visible, but may become visible if user 307 scrolls down (using scroll bars or some other mechanism), as shown in the lower portion of FIG. 3C.

For illustrative purposes, a heavy black rectangle is shown surrounding upper portion 311 of web page 310 to delineate it from lower portion 312. In the description provided herein, upper portion 311, which represents that portion of web page 310 that is initially visible in viewport 321 before any scrolling takes place, is referred to as the above-the-fold portion 311. Images 313A, 313B within portion 311 are referred to as above-the-fold images 313A, 313B. Conversely, lower portion 312, which represents that portion of web page 310 that is not initially visible in viewport 321 but only becomes visible after the user scrolls down, is referred to as the below-the-fold portion 312. Images 313C, 313D within portion 312 are referred to as below-the-fold images 313C, 313D. The demarcation point between portions 311 and 312 is referred to herein as the fold 314.

The specific portion of web page 310 that will be initially visible in viewport 321 may not be known in advance by the author of web page 310, and in fact can vary depending on many different factors, including for example: screen size, screen resolution, window size, browser, browser version, zoom level, user-specified settings, and the like. As discussed below, the system of the present invention includes techniques for predicting which images 313 will be above-the-fold and which will be below-the-fold, and treating images 313 appropriately based on such predictions.

Method

Figure 4:
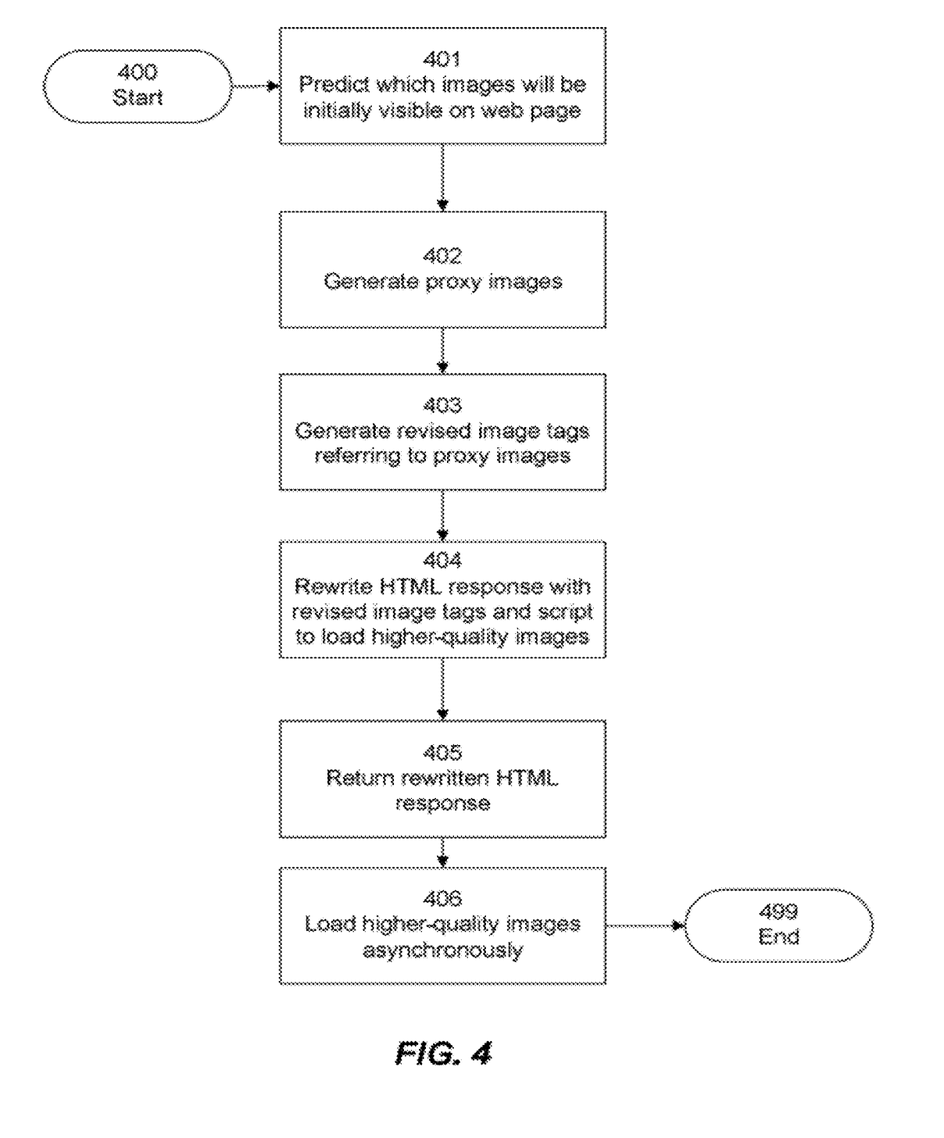
FIG. 4 is a flow diagram depicting a method of image optimization according to one embodiment.

Referring now to FIG. 4, there is shown a flow diagram depicting a method of image optimization according to one embodiment. The steps of FIG. 4 may be performed by proxy 211 and/or any other suitable components. As described above, such components may be part of an optimizer 106 located at router 108 or at some other location; alternatively, method of FIG. 4 may be performed by server 110.

The system predicts 401 which images 313 will be initially visible on web page 310 (i.e., above the fold). Proxy images 214 corresponding to above-the-fold images 313 are generated 402; these proxy images may be stored in any suitable data store 213, whether local or remote. Revised image tags referring to proxy images 214 are generated 403. The HTML response is written 404 using the revised image tags, so that browser 112 will initially load proxy images 214 rather than original images 313.

In one embodiment, the HTML response is further rewritten to include a script to cause browser 112 to request and receive full-resolution versions of images 313. Such requests can be transmitted asynchronously, so that browser 112 need not wait to receive such full-resolution images 313 before proceeding with the rendering of web page 310. Rather, the full-resolution images 313 can be retrieved and rendered after web page has already been initially displayed, and even after user 307 has already begun to interact with web page 310.

Since proxy images 214 are generally lower-resolution versions of original images 313, the process of displaying the visible portion of web page 310 is sped up by initially retrieving and displaying proxy images 214.

Each of these steps will be described in turn.

Predicting Initially Visible Images 401

In one embodiment, the system of the present invention attempts to predict 401 which images 313 in a page will be above the fold, i.e., initially visible when web page 310 is displayed in viewport 321. In one embodiment, such a prediction can be made based on standardized browser window sizes as may be known to apply to a large number of web pages. Alternatively, the system of the present invention can take into account the fact that browser windows may be of non-standard size. In various embodiments, prediction step 401 is performed using one or more of the following mechanisms for determining, or at least estimating, which images will be above the fold. These techniques can be used singly or in any combination.

Fixed Image Count: A fixed number of images 313 are considered to be above the fold. In one embodiment, this fixed number can be defined by the author or administrator of a web page or website, and saved with the configuration that accompanies implementation of the invention.

User Defined Marker: A marker can be inserted into the HTML template, either manually or automatically, to indicate which images 313 are above the fold. In one embodiment, the marker can be an HTML tag, so that any images 313 appearing before the tag are above the fold, and any images 313 appearing after the tag are below the fold. Alternatively, images 313 can be individually tagged, either manually or automatically, to indicate whether they are above or below the fold.

Element ID List: A list of element identifiers, along with above-the-fold or below-the-fold designations, can be generated, either manually or automatically, and stored, for example in data store 214. The fold position 314 can be inferred from the list. In one embodiment, when the first of any of the element identifiers designated as below-the-fold is encountered in the HTML code, it is assumed to be at the fold position.

X,Y coordinates: Proxy 211 renders the page (or an approximation of it) to calculate the likely x,y coordinates of each image 313 as it is expected to be rendered on browser 112. Those coordinates are then used to make the determination as to which image(s) 313 are likely to be above the fold. One skilled in the art will recognize that various pieces of information present in the HTTP request and/or HTTP response, such as HTTP headers, may provide indications of the characteristics of client device 151 and/or browser 112, and that these indications can be incorporated into the process of rendering an approximation of web page 310.

Client-side JavaScript auto-detect: In one embodiment, proxy 211 inserts a script, for example in JavaScript format, into the HTML code to cause browser 112 to detect which images 313 are being displayed above the fold, and to capture and send a list of such above-the-fold images 313 to proxy 211. The script can operate, for example, using the standard JavaScript event model and related events. Proxy 211 thus has information as to which images 313 are above the fold for a given page view at a given browser 112, and can process images 313 accordingly for future requests for that client session. In one embodiment, an adaptive process is used, which continuously refines rules for fold determination based on new data generated by the client-side code.

Server-side JavaScript auto-detect: In one embodiment, proxy 211 samples HTML responses destined for clients 151 and renders the HTML responses, for example using a server-side browser process, similar to the "X, Y coordinates" technique described above. In this case, as with the "Client-side JavaScript auto-detect" method, a script can be added to the HTML to detect which images will be displayed above the fold, and generate a list of such above-the-fold images 313.

In any of these techniques, the size of the above-the-fold displayed area, also referred to as the "viewport size", can be determined using any of a number of methods. For example, browser's 112 visible window 321 (viewport) can simply be assumed to be a certain fixed size, such as 1000 pixels by 550 pixels. In addition, the size of viewport 321 can be measured via a client script or other mechanism, and then stored for later use in data store 213.

Generating Proxy Images 402

In one embodiment, image engine 212 generates 402 proxy images under the direction of proxy 211. Image engine 212 can be any suitable hardware- or software-based component, and can be local or remote with respect to proxy 211. In one embodiment, image engine 212 generates proxy images by compressing original images 313. Any of a number of well-known image compression algorithms can be used. In one embodiment, progressive compression is used for generating proxy images, and intermediate levels of resolution can be provided based on different degrees of the progressive compression.

Generating Revised Image Tags 403

In one embodiment, proxy 211 generates a list of revised image tags that reference the generated proxy image in place of original images 313. The proxy images can be embedded directly into the HTML or embedded in a related sprite resource, or even provided as separate thumbnail images.

In one embodiment, new image tags are generated for proxy versions of above-the-fold images 313. Image tags referring to below-the-fold images 313 may be left as-is, since rendering of those images 313 is less time-critical, as they will not be immediately presented to user 307. Alternatively, image tags referring to below-the-fold images 313 may be replaced by image tags referring to a blank placeholder image, so that bandwidth is not wasted in requesting and receiving below-the-fold images 313; rather, the priority is placed on the above-the-fold images 313.

As described below, full-resolution above-the-fold and below-the-fold images 313 are obtained later, under the direction of an image loader script. To facilitate this subsequent operation, in one embodiment each revised image tag includes a reference to its corresponding original image 313, for example as a custom attribute of the revised image tag. Subsequently, the value of the custom attribute can be used by the image loader script to obtain the higher-resolution (original) version of image 313.

In one embodiment, once the proxy images and revised image tags are available for a given web page, they can be stored in data store 213 and applied repeatedly to many responses. Thus, image engine 212 need not generate new proxy images for each request for that web page. Since, in many cases, at least some images associated with a web page may change relatively infrequently, this ability to re-use proxy images 214 for multiple responses can greatly accelerate performance when responding to page requests. Periodic sampling of server responses can be used to detect changes to images. When images do change, image engine 212 can generate a new proxy image 214, and proxy 211 can generate a revised image tag 403 to reflect the change in the images.

Rewriting the HTML Response 404 and Returning it to Client 405

As described above, in one embodiment, proxy 211 is implemented as an accelerator or similar in-line network device that acts as an HTTP proxy capable of parsing and rewriting HTML responses, as represented by optimizer 106 in FIG. 1A. Alternatively, proxy 211 may be a server-side software and/or hardware component or module, as represented by optimizer 106 in FIG. 1B. In step 404, proxy 211 rewrites the HTML response and replaces the original image tags with the revised tags generated in step 403, so as to cause proxy images to be loaded in place of the originals, for those images 313 that are located above the fold.

In addition, the HTML response is further rewritten to include a script, for example in JavaScript format, to cause browser 112 to request and receive higher-quality versions of those images 313 for which proxy images were displayed. The script can be automatically generated by proxy 211 and included in the HTML code to be returned to client 151.

In step 405, this rewritten HTML response is returned to client 151 for rendering at browser 112.

In this manner, when browser 112 renders web page 310, proxy images will be initially displayed for those images 313 that are located above the fold.

Loading Higher Quality Images 406

Under the direction of the script inserted by proxy 211, browser 112 requests and receives higher-quality versions of those images 313 for which proxy images were displayed. In one embodiment, this request for higher-quality images 313 can take place asynchronously, so that browser 112 need not wait to receive such full-resolution images 313 before proceeding with the rendering of web page 310. Rather, the full-resolution images 313 can be retrieved and rendered after web page has already been initially displayed, and even after user 307 has already begun to interact with web page 310.

In one embodiment, images may be provided in any number of successive stages of compression. Thus, the script may cause browser 112 to request, receive, and render an intermediate-quality version of image 313, followed by one or more successively higher quality versions. Alternatively, the script may cause browser 112 to determine a suitable level of quality based on available processing power, viewport size, bandwidth, browser version, and/or any other factor, and may further cause browser 122 to request a version of image 313 concomitant with the determined suitable level of quality. In this manner, the display of images 313 on browser 122 can be well-suited to the particular capabilities and characteristics of the equipment and conditions, whether or not successive rendering is to be performed.

In one embodiment, a transition effect, such as a dissolve effect, fade in/out effect, and/or the like, can be presented when replacing a proxy image with a higher-quality version of the image 313.

Sequence Diagram

Figure 5:
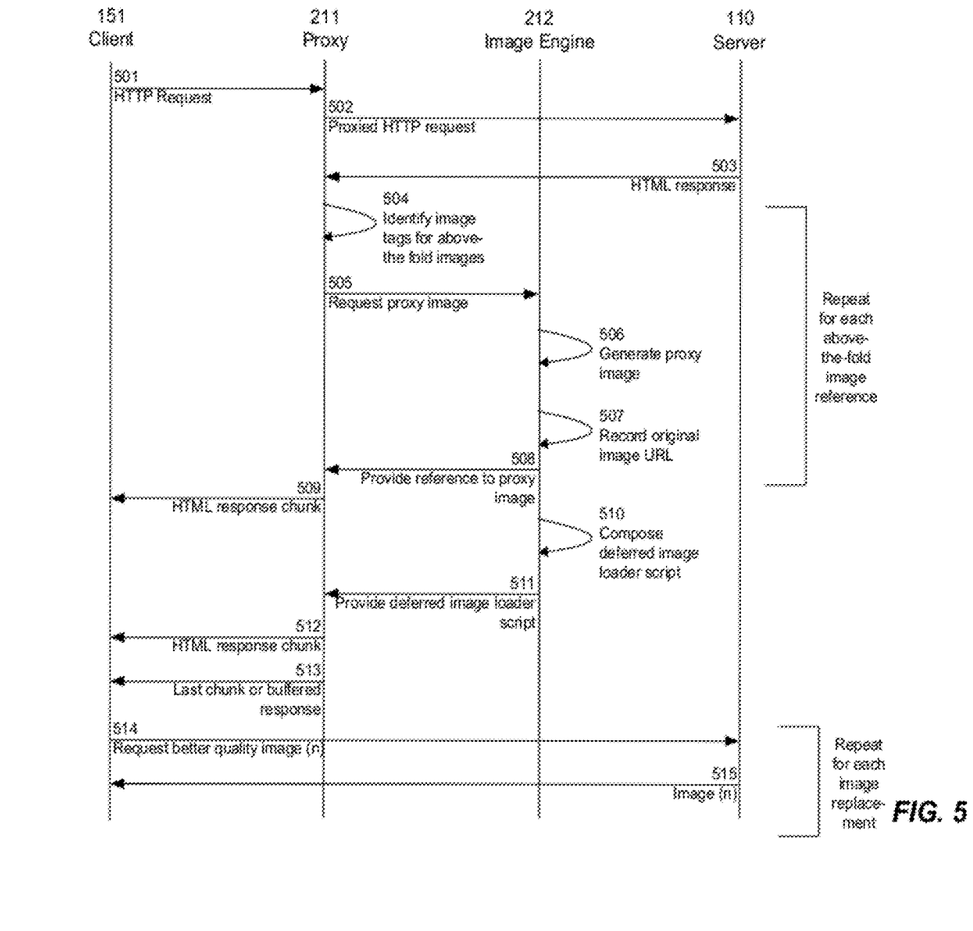
FIG. 5 is a sequence diagram illustrating interaction between system components in performing image optimization according to one embodiment.

Referring now to FIG. 5, there is shown a sequence diagram illustrating interaction between system components in performing image optimization according to one embodiment. As depicted in FIG. 5, in one embodiment the steps depicted in the sequence diagram are performed by the system components described above in connection with FIG. 2. However, one skilled in the art will recognize that the depicted steps can be performed by other components without departing from the essential characteristics of the present invention as set forth in the claims.

Client 151 issues a request 501 for content such as a web page. For example, such a request can be issued by browser 112, and can be a standard HTTP GET or POST request specifying a URL.

Proxy 211 intercepts 502 the HTTP request and relays 502 the request to server 110. Server 110 returns 503 an HTTP response, such as an HTML text stream responding to the HTTP GET or POST request.

Proxy 211 intercepts the HTTP response, identifies image representations such as image tags in HTML, and determines 504 those image tags that represent above-the-fold images (i.e., those images 313 that are likely to be initially visible when web page 310 is displayed). In one embodiment, this step is performed by executing an HTML parser method capable of accurately identifying embedded image references within the HTML text response string.

For each identified image tag, proxy 211 requests a proxy image reference from image engine 212, to replace the reference in the HTML response. In one embodiment, this causes image engine 212 to generate 506 a proxy image 214 for each below-the-fold image. In another embodiment, image engine 212 generates 506 proxy images 214 for all images 313, and not merely below-the-fold images 313. In another embodiment, image engine 212 generates 506 blank placeholders for all below-the-fold images and a proxy image 214 for each above-the-fold image. One skilled in the art will recognize that various alternatives are possible for determining which above-the-fold and below-the-fold images should be initially rendered at full resolution, reduced resolution, or as blank placeholders.

For each image 313 to be processed in this manner, image engine 212 requests and receives the original image 313 based on the reference in the HTML response, compresses it, and saves and/or caches the compressed version as a proxy image 214 for future use, for example in local or remote storage such as data store 213. In some embodiments, proxy image 214 is transformed into a DataUri so that it can be included directly in-line in web page 310. In another embodiment, proxy image 214 is saved as an external file. In yet another embodiment, proxy image 214 is included in a package with other objects (for example in an image sprite, JavaScript package, MIME HTML package, a JAR package, or the like). A revised HTML tag is generated to refer to proxy image 214.

In one embodiment, image engine 212 records 507 the original URL (or other reference) for each image 313 being processed. This original URL will later be used by client 151 (under the direction of a deferred image loader script) to retrieve full-resolution images after initial rendering of web page 310. In one embodiment, these original URLs are stored as custom attributes within the revised HTML tag sent to client 151.

Image engine 212 provides 508 a reference to the proxy image. In one embodiment, proxy 211 inserts this reference in the HTML code to be sent to client 151, replacing the reference to the original version of image 313. This will cause client 151 to retrieve the proxy image instead of the original version of image 313.

Alternatively, any of a number of replacement techniques can be used, including for example and without limitation:
  In-line DataUri: The image data is included directly in an HTML image tag element attribute, for example as base64-encoded text.
  Image Sprite: Multiple images are tiled into a single sprite image and then referenced using x and y coordinates by many HTML image tags.
  MIME HTML/External file: Multiple images are added to a cabinet file (e.g., MHTML) and then referenced (e.g., by index) in many HTML image tags.

One skilled in the art will recognize that the reference to the proxy image, or the proxy image itself, can be conveyed to client 151 in any suitable method.

In one embodiment, steps 504 through 508 are performed for each of the image tags found in the HTML response.

Proxy 211 returns 509 an HTML response to client 151, including references to the proxy images (or including the proxy images themselves). In one embodiment, proxy 211 and/or server 110 support the use of chunked encoding, so that the HTML response can be returned to client 151 in multiple parts (for example, as each chunk is ready to be sent). Alternatively, proxy 211 can buffer the HTML response (which may include the deferred image loader script described below) until it is complete and is ready to be sent, and then send it to client 151 in a single part.

In one embodiment, image engine composes 510 a deferred image loader script for executing transitions from proxy images to original, better quality images 313. The deferred image loader script can include instructions to cause client 151 to retrieve the original, better quality images 313 (and/or any intermediate-quality images), according to any suitable parameters and conditions. In one embodiment, for example, the script is configured to cause client 151 to retrieve original images 313 immediately after the last above-the-fold has been rendered. In another embodiment, the script is configured to cause client 151 to retrieve original images 313 after all (or some predetermined number of) resources referenced on web page 310 have been loaded. In yet another embodiment, the script is configured to cause client 151 to retrieve original images 313 after all other deferred actions have been executed. One skilled in the art will recognize that these are merely examples, and that the script can be configured in many other ways. Conditional operation of the script can also be supported, so that the script is configured to run upon detection of any suitable trigger event, or after any predetermined time period.

In one embodiment, the deferred image loader script is configured to cause client 151 to retrieve original images 313 using any suitable optimization technique.

In another embodiment, the deferred image loader script can dynamically load images that are currently visible on the user's viewport by detecting when the user scrolls the window, and then loading new images when they become visible in the viewport.

Image engine 212 provides 511 the deferred image loader script to proxy 211, which inserts the script in the HTML code to be returned to client 151.

If chunked encoding is supported, proxy 211 may transmit an HTML response chunk 512 including the deferred image loader script. Otherwise, proxy 211 may continue to buffer the response until the entire HTML page is ready, and then send the entire page including the deferred image loader script.

If chunked encoding is supported, a last chunk message 513 is sent to client 151, to inform client 151 that the HTML response is complete. Alternatively, if the HTML response has been buffered at proxy 211, it is now sent 513 to client 151.

One skilled in the art will recognize that the specific sequence of steps shown in the diagram is merely exemplary, and that the steps can be performed in a different order. For example, insertion of the image loader script can take place before the first HTML response chunk is returned to client 151.

Browser 112 running at client 151 renders 514 web page 310, or at least the above-the-fold portion thereof. At the appropriate time as specified in the script, client 151 requests 514 one or more of the better quality images via a HTTP GET request. Server 110 responds 515 to the request with the requested image(s) 313, for example as an HTTP binary response. Browser 112 running at client 151 renders image 313. In one embodiment, browser 112 executes a script to display a transition between the proxy image and better quality image 313.

As described above, in one embodiment, intermediate-quality images may be provided, in which case the script may be configured to request such intermediate-quality image(s) from image engine 212 via proxy 211, and then to request original high-quality image(s) 313 from server 110 at the appropriate time. Again, transitions can be shown between successive displays of images.

In one embodiment, steps 514 and 515 are performed once for each image replacement.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for presenting content in a client/server environment, comprising:
    at a proxy device communicatively coupled to a client and a server via a communications network, performing the steps of:
    intercepting a content item being transmitted from the server to the client;
    identifying a plurality of resource references in the content item, each resource reference corresponding to a resource;
    identifying at least a subset of the resources as being likely to be included within an initially viewable portion of the content item to be presented on an output device prior to presentation of at least one other resource in the content item;
    for each of the resources identified as being likely to be included within the initially viewable portion of the content item:
    retrieving an original version of the resource;
    generating a proxy resource from the entire original version of the resource;
    storing the generated proxy resource;
    modifying the content item to provide the generated proxy resource to the client by replacing a reference to the entire original version of the resource with a revised reference to the resource including a reference to the corresponding entire original version of the resource and further providing a script to the client to automatically request higher quality versions of the resource, wherein modifying the content item includes replacing the resource reference corresponding to the resource with a modified resource reference corresponding to the stored generated proxy resource; and
    transmitting the modified content item to the client.

2. The method of claim 1, wherein:
    the content item comprises a web page;
    each resource comprises an image associated with a position in the web page; and
    each proxy resource comprises a proxy image.

3. The method of claim 2, wherein generating a proxy image from an original version of an image comprises generating a version of the image that is of lower resolution than the original version of the image.

4. The method of claim 2, wherein generating a proxy image from an original version of an image comprises compressing the image to generate a version of the image that is of lower resolution than the original version of the image.

5. The method of claim 2, wherein generating a proxy image from an original version of an image comprises applying progressive compression to generate a version of the image that is of lower resolution than the original version of the image.

6. The method of claim 2, wherein generating a proxy image from an original version of an image comprises generating a version of the image that is smaller than the original version of the image.

7. The method of claim 2, wherein identifying at least a subset of the images as being likely to be included within an initially viewable portion of the web page comprises:
    determining a display area size;
    identifying a region of the web page corresponding to the display area size; and
    identifying images associated with positions within the identified region of the web page.

8. The method of claim 7, wherein determining a display area size comprises determining a size of a window on a display screen.

9. The method of claim 7, wherein determining a display area size comprises determining a size based on at least one characteristic of an output device associated with the client.

10. The method of claim 7, wherein determining a display area size comprises determining a size based on a predefined size in common use for displays.

11. The method of claim 7, wherein determining a display area size comprises:

causing a script to return data specifying the size of a display area; and
receiving data generated by the script.

12. The method of claim 2, wherein:
the client is configured to provide an interactive scrolling ability in response to a user input; and
identifying at least a subset of the images as being likely to be included within an initially viewable portion of the web page comprises identifying at least a subset of the images as being likely to be included within a portion of the web page prior to performing any scrolling.

13. The method of claim 1, wherein modifying the content item to provide the generated proxy resource to the client comprises replacing the resource reference corresponding to the resource with a modified resource reference corresponding to the stored generated proxy resource.

14. The method of claim 1, wherein modifying the content item to provide the generated proxy resource to the client comprises including the modified resource in-line within the content item.

15. The method of claim 1, wherein modifying the content item to provide the generated proxy resource to the client comprises including the modified resource in a package with at least one object associated with the content item.

16. The method of claim 1, further comprising, at the proxy device:
prior to transmitting the modified content item to the client, further modifying the content item to include a script configured to cause the client to issue a deferred request for at least one original version of at least one of the resources.

17. The method of claim 16, further comprising, at the proxy device:
generating at least one additional, intermediate-level proxy resource from the entire original version of the resource; and
wherein further modifying the content item to include a script comprises modifying the content item to include a script configured to cause the client to issue a sequence of deferred requests for successively higher-resolution versions of the resource.

18. The method of claim 1, wherein transmitting the modified content item to the client comprises transmitting the modified content item to the client in at least two parts.

19. The method of claim 1, wherein generating a proxy resource from an entire original version of a resource comprises applying compression to the original version of the resource.

20. The method of claim 1, further comprising, at the proxy device:
generating at least one additional, intermediate-level proxy resource from the entire original version of the resource;
responsive to a request from the client, providing the intermediate-level proxy resource.

21. The method of claim 1, wherein the client is configured to provide an interactive scrolling ability in response to user input, the method further comprising:
transmitting a script to cause the client to perform the steps of:
detecting a scrolling operation causing at least one additional resource to be within a viewable region on the output device; and
responsive to the detected scrolling operation:
retrieving the at least one additional resource; and
displaying the retrieved at least one additional resource on the display device.

22. A computer program product for presenting content in a client/server environment, comprising:
a non-transitory computer-readable storage medium; and
a computer program code, encoded on the medium, configured to cause at least one processor at a proxy device communicatively coupled to a client and a server via a communications network to perform the steps of:
intercepting a content item being transmitted from the server to the client;
identifying a plurality of resource references in the content item, each resource reference corresponding to a resource;
identifying at least a subset of the resources as being likely to be included within an initially viewable portion of the content item to be presented on an output device prior to presentation of at least one other resource in the content item;
for each of the resources identified as being likely to be included within the initially viewable portion of the content item:
retrieving an original version of the resource;
generating a proxy resource from the entire original version of the resource;
storing the generated proxy resource;
modifying the content item to provide the generated proxy resource to the client by replacing a reference to the entire original version of the resource with a revised reference to the resource including a reference to the corresponding entire original version of the resource and further providing a script to the client to automatically request higher quality versions of the resource; and
transmitting the modified content item to the client.

23. The computer program product of claim 22, wherein:
the content item comprises a web page;
each resource comprises an image associated with a position in the web page; and
each proxy resource comprises a proxy image.

24. The computer program product of claim 23, wherein the computer program code configured to cause at least one processor to generate a proxy image from an entire original version of an image comprises computer program code configured to cause at least one processor to generate a version of the image that is of lower resolution than the entire original version of the image.

25. The computer program product of claim 23, wherein the computer program code configured to cause at least one processor to identify at least a subset of the images as being likely to be included within an initially viewable portion of the web page comprises computer program code configured to cause at least one processor to perform the steps of:
determining a display area size;
identifying a region of the web page corresponding to the display area size; and
identifying images associated with positions within the identified region of the web page.

26. The computer program product of claim 25, wherein the computer program code configured to cause at least one processor to determine a display area size comprises computer program code configured to cause at least one processor to perform the steps of:
causing a script to return data specifying the size of a display area; and
receiving data generated by the script.

27. The computer program product of claim 23, wherein:
the client is configured to provide an interactive scrolling ability in response to a user input; and
computer program code configured to cause at least one processor to identify at least a subset of the images as being likely to be included within an initially viewable portion of the web page comprises computer program code configured to cause at least one processor to identify at least a subset of the images as being likely to be included within a portion of the web page prior to performing any scrolling.

28. The computer program product of claim 22, wherein the computer program code configured to cause at least one processor to modify the content item to provide the generated proxy resource to the client comprises computer program code configured to cause at least one processor to replace the resource reference corresponding to the resource with a modified resource reference corresponding to the stored generated proxy resource.

29. The computer program product of claim 22, wherein the computer program code configured to cause at least one processor to modify the content item to provide the generated proxy resource to the client comprises computer program code configured to cause at least one processor to include the modified resource in-line within the content item.

30. The computer program product of claim 22, further comprising computer program code configured to cause at least one processor at the proxy device to perform the step of:
prior to transmitting the modified content item to the client, further modifying the content item to include a script configured to cause the client to issue a deferred request for at least one original version of at least one of the resources.

31. The computer program product of claim 22, wherein the client is configured to provide an interactive scrolling ability in response to a user input, the computer program product further comprising computer program code configured to cause at least one processor at the proxy device to transmit a script to cause the client to perform the steps of:
detecting a scrolling operation causing at least one additional resource to be within a viewable region on the output device; and
responsive to the detected scrolling operation:
retrieving the at least one additional resource; and
displaying the retrieved at least one additional resource on the display device.

32. A system for presenting content in a client/server environment, comprising:
a client machine, communicatively coupled to a computing network;
a server, communicatively coupled to the computing network;
a storage device;
a proxy device, communicatively coupled to the computing network and to the storage device, the proxy device configured to perform the steps of:
intercepting a content item being transmitted from the server to the client;
identifying a plurality of resource references in the content item, each resource reference corresponding to a resource;
identifying at least a subset of the resources as being likely to be included within an initially viewable portion of the content item to be presented on an output device prior to presentation of at least one other resource in the content item;
for each of the resources identified as being likely to be included within the initially viewable portion of the content item:
retrieving an original version of the resource;
generating a proxy resource from the entire original version of the resource;
causing the storage device to store the generated proxy resource;
modifying the content item to provide the generated proxy resource to the client by replacing a reference to the entire original version of the resource with a revised reference to the resource including a reference to the corresponding entire original version of the resource and further providing a script to the client to automatically request higher quality versions of the resource; and
transmitting the modified content item to the client.

33. The system of claim 32, wherein:
the content item comprises a web page;
each resource comprises an image associated with a position in the web page; and
each proxy resource comprises a proxy image.

34. The system of claim 33, wherein the proxy device generates a proxy image from an original version of an image by generating a version of the image that is of lower resolution than the original version of the image.

35. The system of claim 33, wherein the proxy device identifies at least a subset of the images as being likely to be included within an initially viewable portion of the web page by performing the steps of:
determining a display area size;
identifying a region of the web page corresponding to the display area size; and
identifying images associated with positions within the identified region of the web page.

36. The system of claim 35, wherein the proxy device determines a display area size by performing the steps of:
causing a script to return data specifying the size of a display area; and
receiving data generated by the script.

37. The system of claim 33, wherein:
the client is configured to provide an interactive scrolling ability in response to a user input; and
computer program code configured to cause at least one processor to identify at least a subset of the images as being likely to be included within an initially viewable portion of the web page comprises computer program code configured to cause at least one processor to identify at least a subset of the images as being likely to be included within a portion of the web page prior to performing any scrolling.

38. The system of claim 32, wherein the computer program code configured to cause at least one processor to modify the content item to provide the generated proxy resource to the client comprises computer program code configured to cause at least one processor to replace the resource reference corresponding to the resource with a modified resource reference corresponding to the stored generated proxy resource.

39. The system of claim 32, wherein the computer program code configured to cause at least one processor to modify the content item to provide the generated proxy resource to the client comprises computer program code configured to cause at least one processor to include the modified resource in-line within the content item.

40. The system of claim 32, further comprising computer program code configured to cause at least one processor at the proxy device to perform the step of:
- prior to transmitting the modified content item to the client, further modifying the content item to include a script configured to cause the client to issue a deferred request for at least one original version of at least one of the resources.

41. The system of claim 32, wherein the client is configured to provide an interactive scrolling ability in response to a user input, and wherein the proxy device is further configured to transmit a script to cause the client to perform the steps of:
- detecting a scrolling operation causing at least one additional resource to be within a viewable region on the output device; and
- responsive to the detected scrolling operation:
- retrieving the at least one additional resource; and
- displaying the retrieved at least one additional resource on the display device.

\* \* \* \* \*